(12) United States Patent
Morris et al.

(10) Patent No.: US 7,875,720 B2
(45) Date of Patent: Jan. 25, 2011

(54) FLUORESCENT MONOMERS AND TAGGED TREATMENT POLYMERS CONTAINING SAME FOR USE IN INDUSTRIAL WATER SYSTEMS

(75) Inventors: John D. Morris, Naperville, IL (US);
Barbara E. Moriarty, Palatine, IL (US);
Mingli Wei, Naperville, IL (US);
Patrick G. Murray, Yorkville, IL (US);
Jerry L. Reddinger, Kingsport, TN (US)

(73) Assignee: Nalco Company, Naperville, IL (US)

( * ) Notice: Subject to any disclaimer, the term of this patent is extended or adjusted under 35 U.S.C. 154(b) by 818 days.

(21) Appl. No.: 10/658,648

(22) Filed: Sep. 9, 2003

(65) Prior Publication Data

US 2004/0135124 A1    Jul. 15, 2004

Related U.S. Application Data

(63) Continuation-in-part of application No. 09/560,881, filed on Apr. 27, 2000, now Pat. No. 6,645,428.

(51) Int. Cl.
*C07D 221/06* (2006.01)
(52) U.S. Cl. ..................................... 546/79
(58) Field of Classification Search ............... 546/79; 514/290
See application file for complete search history.

(56) References Cited

U.S. PATENT DOCUMENTS

| 4,813,973 A | 3/1989 | Winnik et al. |
| 5,635,575 A | 6/1997 | Kira et al. |
| 5,635,576 A | 6/1997 | Foll et al. |
| 5,986,030 A * | 11/1999 | Murray et al. ............ 526/268 |
| 6,403,239 B2 * | 6/2002 | Chen et al. ................ 428/690 |
| 7,026,019 B2 | 4/2006 | Dutova et al. |

FOREIGN PATENT DOCUMENTS

| GB | 1003083 | * | 9/1965 |
| GB | 1054436 | * | 11/1967 |
| JP | 49-43688 | * | 11/1968 |
| JP | 47-12553 | * | 4/1972 |

OTHER PUBLICATIONS

Caplus English Abstract JP 47012553 Apr. 1972, Fluorescent whitening of synthetic fibers.*
Abstract, Konstantinova et al , 1993, Synthesis of some 1,8 Naphthalic anhydride derivatives.*
Structure for CAS Registry No. 276878-97-8; date and time of registration of the compound that was given CAS Registry No. 276878-97-8 is stated to be Jul. 13, 2000 at 12:53, by CAS®.
Office Action, U.S. Appl. No. 09/560,881, dated Nov. 19, 2002.
Notice of allowance, U.S. Appl. No. 10/658,715, dated Sep. 14, 2006.

* cited by examiner

*Primary Examiner*—Rita J Desai
(74) *Attorney, Agent, or Firm*—Joshua D. Bishop; Michael B. Martin

(57) ABSTRACT

Fluorescent monomers are described and claimed which are synthesized by reacting a substituted or non-substituted naphthalic anhydride with an amine and with a moiety containing a polymerizable group. Such monomers are useful for the preparation of tagged treatment polymers. Such tagged treatment polymers are useful as scale inhibitors in industrial water systems.

1 Claim, No Drawings

FLUORESCENT MONOMERS AND TAGGED TREATMENT POLYMERS CONTAINING SAME FOR USE IN INDUSTRIAL WATER SYSTEMS

CROSS-REFERENCE TO RELATED PATENT APPLICATIONS

This patent application is a continuation-in-part patent application of U.S. patent application Ser. No. 09/560,881; FLUORESCENT MONOMERS AND TAGGED TREATMENT POLYMERS CONTAINING SAME FOR USE IN INDUSTRIAL WATER SYSTEMS, filed Apr. 27, 2000, now U.S. Pat. No. 6,645,428.

FIELD OF THE INVENTION

This invention relates to fluorescent monomers. In another aspect, this invention relates to tagged treatment polymers that contain these fluorescent monomers. In a further aspect, this invention relates to the use of tagged treatment polymers containing fluorescent monomer(s) therein in industrial water systems.

BACKGROUND OF THE INVENTION

In many industrial water systems that employ polymers as water treatment agents it may be desirable to tag or mark such polymers to facilitate monitoring thereof. By the term "monitoring" is meant herein any type of tracing or tracking to determine the location or route of the polymers, and any type of determination of the concentration or amount of the polymer at any given site, including singular or intermittent or continuous monitoring. For instance, it may be desirable to monitor water treatment polymers in water systems, or to monitor polymers that may be present in waste fluids before disposal, or to monitor the polymer used in fluids for downhole oil well applications, or to monitor polymers that may be present in fluids used to wash a manufactured product.

As seen from the above list of possible applications of polymer monitoring, the purpose of such monitoring may be to trace or track or determine the level of the polymer itself, or to trace or track or determine the level of some substance in association with the polymer, or to determine some property of the polymer or substance in association with the polymer, for instance its leachability.

There are many industrial water systems. Because water resources are becoming limited and efficient utilization of water is required, various methods have been adopted to reduce the amount of water used in all industrial water systems. As the methods for reducing the amount of water are put into practice, unfavorable events can occur. These unfavorable events occur because the quality of the water in the system is progressively deteriorated. These unfavorable events can include the formation of scale.

To prevent or minimize unfavorable events, various kinds of treatment agents for treatment of water systems have been used. It has been found that organic substances, including certain types of treatment polymers, are effective for preventing formation of scale. These certain types of treatment polymers are known to persons of ordinary skill in the art of industrial water treatment and are widely used by themselves or as one of many possible components in scale inhibition products.

When a treatment polymer is used for preventing formation of scale the concentration of the treatment polymer in the water system is the important factor so that the treatment polymer performs the desired function with good efficiency. For example, a treatment polymer added to a cooling water system can be consumed by many causes. With consumption, the amount of the treatment polymer dissolved in the cooling water does not remain the same as the amount added to the cooling water. Therefore, it is important for the optimum operation of an industrial water system that practical methods are known to determine the concentration of treatment polymers in the water of the industrial water system.

In general practice, the amount of the treatment polymer added to the water in an industrial water system can be measured using various analytical methods. The use of an inert fluorescent tracer or mass balance measurement method as described in U.S. Pat. Nos. 4,783,314; 4,992,380; and 5,171,450, hereby incorporated by reference; to perform this analysis is known in the art.

In the inert fluorescent tracer method, an inert fluorescent tracer is added to an industrial water system, with the amount of inert fluorescent tracer added being proportional to the amount of the treatment polymer added. By using a fluorometer to measure the fluorescent signal of the inert fluorescent tracer, the amount of the inert fluorescent tracer can be determined by using a calibration curve to relate the amount of fluorescent signal detected to the amount of the inert fluorescent tracer present. Because the inert fluorescent tracer and the treatment polymer are added to the industrial water system in known proportions, by knowing the amount of inert fluorescent tracer present it also means that the amount of treatment polymer present is known.

The inert fluorescent tracer method can be conducted on-line and in real time so that any changes in the amount of treatment polymer being added to the system can be made immediately.

As a complement to the use of an inert tracer system, it has been found that treatment polymers that are used as components of scale inhibitors in industrial water systems could be monitored if tagged with a fluorescent monomer. The amount of fluorescent monomer incorporated into the tagged treatment polymer must be enough so that the fluorescence of the tagged treatment polymer can be adequately measured; however, it must not be so much that the performance of the tagged treatment polymer as a treatment agent for the water is decreased. Because the concentration of the tagged treatment polymer itself can be determined using a fluorometer, it is now possible to measure consumption of the tagged treatment polymer directly. It is important to be able to measure consumption directly because consumption of a treatment polymer usually indicates that a non-desired event, such as scaling, is occurring. Thus, by being able to measure consumption of the tagged treatment polymer, there can be achieved an on-line, real time, in-situ measurement of scaling activity in the cooling system.

Certain tagged treatment polymers are known, see U.S. Pat. No. 5,986,030, and U.S. patent application Ser. No. 09/465,146, filed Dec. 16, 1999, now pending, hereby incorporated by reference. However, there is not an abundance of viable tagged treatment polymers for use as treatment polymers in industrial water systems. Therefore, it is desirable to produce additional tagged treatment polymers that have a fluorescent signal so that a fluorometer can be used to measure the fluorescent signal of the tagged treatment polymer and determine the concentration of tagged treatment polymer currently present in the industrial water system from that information.

It is known that tagging of polymers is difficult to accomplish because of the difficulty in chemically combining fluorescent moieties with non-fluorescent polymers. Therefore, in order to synthesize tagged treatment polymers it is also desirable to produce fluorescent monomers that are readily polymerized to form tagged treatment polymers.

SUMMARY OF THE INVENTION

The first aspect of the instant claimed invention is a fluorescent monomer selected from the group consisting of compounds of the formulae:

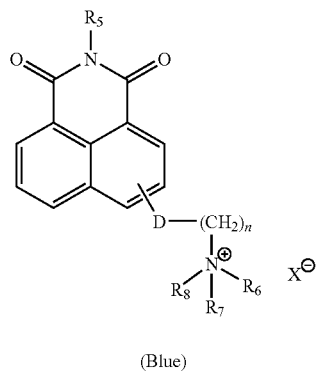

(Blue)

wherein n is an integer, selected from the group consisting of 1-10;

$R_6$ and $R_7$ are alkyl;

$R_8$ is selected from the group consisting of allyl, alkyl, vinylbenzyl and 2-hydroxy-3-allyloxypropyl;

$R_5$ is selected from the group consisting of alkyl, alkylamino, hydroxyalkyl and allyl;

D is oxygen or nitrogen or sulfur or nonexistent; with the proviso that when D is nonexistent, $(CH_2)_n$ is bonded directly to a carbon on the ring; and X is an anionic counter ion.

The second aspect of the instant claimed invention is a tagged treatment polymer selected from the group consisting of:

$$G_a Q_j W_t \qquad (1)$$

wherein G is Monomer (Blue) as previously defined;

wherein Q is selected from the group consisting of acrylic acid and salts thereof, methacrylic acid and salts thereof, maleic acid and salts thereof, maleic anhydride, acrylamide, crotonic acid, acrylamidomethylpropane sulfonic acid and salts thereof;

wherein W is selected from the group consisting of:

acrylic acid and salts thereof, methacrylic acid and salts thereof, itaconic acid and salts thereof, maleic acid and salts thereof, maleic anhydride, crotonic acid and salts thereof, acrylamide, methacrylamide, vinyl sulfonic acid, styrene sulfonate, N-tertbutylacrylamide, N-isopropylacrylamide, butoxymethylacrylamide, N,N-dimethylacrylamide, N,N-diethylacrylamide, dimethylaminoethyl acrylate methyl chloride quaternary salts, dimethylaminoethyl acrylate benzyl chloride quaternary salts, dimethylaminoethyl acrylate methyl sulfate quaternary salt, dimethylaminoethyl methacrylate methyl sulfate quaternary salt, dimethylaminoethyl acrylamide methyl sulfate quaternary salts, dimethylaminopropyl acrylamide methyl sulfate quaternary salts, dimethylaminopropyl methacrylamide methyl sulfate quaternary salts, diallyldimethyl ammonium chloride, N-vinyl formamide, dimethylamino ethyl methacrylate acid salts (including, but not limited to, sulfuric acid and hydrochloride acid salts), dimethylaminoethyl methacrylate methyl chloride quaternary salt, dimethylaminoethyl methacrylate benzyl chloride quaternary salt, methacrylamidopropyl trimethyl ammonium chloride, acrylamidopropyl trimethyl ammonium chloride, methylene bis acrylamide, triallylamine, acid salts of triallylamine, ethylene glycol dimethacrylate, hydroxymethylacrylate, hydroxyethylacrylate, hydroxypropylacrylate, hydroxypropylmethacrylate, diethylene glycol dimethacrylate, triethylene glycol dimethylacrylate, polyethylene glycol dimethacrylate, glycidyl methacrylate, acrylamidomethylpropane sulfonic acid and the sodium salt thereof, vinyl alcohol, vinyl acetate, and N-vinylpyrrolidone;

with the proviso that Q and W cannot both be the same;
wherein a is from about 0.001 to about 10.0 mole percent;
wherein j is from about 0 to about 99.999 mole percent;
wherein t is from about 0 to about 99.999 mole percent; and
wherein a+j+t=100;

$$G_a Q_v W_f S_c \qquad (2)$$

wherein G is as previously defined;
wherein Q is as previously defined;
wherein W is as previously defined, with the proviso that Q and W cannot both be the same;
wherein S is selected from the group consisting of sulfomethylacrylamide and sulfoethylacrylamide;
wherein a is from about 0.001 to about 10.00 mole percent;
wherein v is from about 0 to about 97.999 mole percent;
wherein f is from about 1 to about 97.999 mole percent;
wherein c is from about 1 to about 40 mole percent; and
wherein a+v+f+c=100.

The third aspect of the instant claimed invention is a process for the inhibition of scale formation in an industrial water system which comprises introducing into said industrial water system a tagged treatment polymer selected from the group consisting of:

$$G_a Q_j W_t \qquad (1)$$

wherein G is Monomer (Blue) as previously defined;
wherein Q is selected from the group consisting of acrylic acid and salts thereof, methacrylic acid and salts thereof, maleic acid and salts thereof, maleic anhydride, acrylamide, crotonic acid, acrylamidomethylpropane sulfonic acid and salts thereof;
wherein W is selected from the group consisting of:

acrylic acid and salts thereof, methacrylic acid and salts thereof, itaconic acid and salts thereof, maleic acid and salts thereof, maleic anhydride, crotonic acid and salts thereof, acrylamide, methacrylamide, vinyl sulfonic acid, styrene sulfonate, N-tertbutylacrylamide, N-isopropylacrylamide, butoxymethylacrylamide, N,N-dimethylacrylamide, N,N-diethylacrylamide, dimethylaminoethyl acrylate methyl chloride quaternary salts, dimethylaminoethyl acrylate benzyl chloride quaternary salts, dimethylaminoethyl acrylate methyl sulfate quaternary salt, dimethylaminoethyl methacrylate methyl sulfate quaternary salt, dimethylaminoethyl acrylamide methyl sulfate quaternary salts, dimethylaminopropyl acrylamide methyl sulfate quaternary salts, dimethylaminopropyl methacrylamide methyl sulfate quaternary salts, diallyldimethyl ammonium chloride, N-vinyl formamide, dimethylamino ethyl methacrylate acid salts (including, but not limited to, sulfuric acid and hydrochloride acid salts), dimethylaminoethyl methacrylate methyl chloride quaternary salt, dimethylaminoethyl methacrylate benzyl chloride quaternary salt, methacrylamidopropyl trimethyl ammonium chloride, acrylamidopropyl trimethyl ammonium chloride, methylene bis acrylamide, triallylamine, acid salts of triallylamine, ethylene glycol dimethacrylate, hydroxymethylacrylate, hydroxyethylacrylate, hydroxypropylacrylate, hydroxypropylmethacrylate, diethylene glycol dimethacrylate, triethylene glycol dimethylacrylate, polyethylene glycol dimethacrylate, glycidyl methacrylate, acrylamidomethylpropane sulfonic acid and the sodium salt thereof, vinyl alcohol, vinyl acetate, and N-vinylpyrrolidone;

with the proviso that Q and W cannot both be the same;
wherein a is from about 0.001 to about 10.0 mole percent;
wherein j is from about 0 to about 99.999 mole percent;
wherein t is from about 0 to about 99.999 mole percent; and
wherein a+j+t=100;

$$G_a Q_v W_f S_c \tag{2}$$

wherein G is as previously defined;
wherein Q is as previously defined;
wherein W is as previously defined, with the proviso that Q and W cannot both be the same;
wherein S is selected from the group consisting of sulfomethylacrylamide and sulfoethylacrylamide;
wherein a is from about 0.001 to about 10.00 mole percent;
wherein v is from about 0 to about 97.999 mole percent;
wherein f is from about 1 to about 97.999 mole percent;
wherein c is from about 1 to about 40 mole percent; and
wherein a+v+f+c=100.

in an amount sufficient to inhibit scale formation.

The fourth aspect of the instant claimed invention is a method for maintaining the desired amount of tagged treatment polymer in an industrial water system comprising the steps of:

i) adding to said industrial water system a tagged treatment polymer, selected from the group consisting of:

$$G_a Q_j W_t \tag{1}$$

wherein G is Monomer (Blue) as previously defined;
wherein Q is selected from the group consisting of acrylic acid and salts thereof, methacrylic acid and salts thereof, maleic acid and salts thereof, maleic anhydride, acrylamide, crotonic acid, acrylamidomethylpropane sulfonic acid and salts thereof;
wherein W is selected from the group consisting of:

acrylic acid and salts thereof, methacrylic acid and salts thereof, itaconic acid and salts thereof, maleic acid and salts thereof, maleic anhydride, crotonic acid and salts thereof, acrylamide, methacrylamide, vinyl sulfonic acid, styrene sulfonate, N-tertbutylacrylamide, N-isopropylacrylamide, butoxymethylacrylamide, N,N-dimethylacrylamide, N,N-diethylacrylamide, dimethylaminoethyl acrylate methyl chloride quaternary salts, dimethylaminoethyl acrylate benzyl chloride quaternary salts, dimethylaminoethyl acrylate methyl sulfate quaternary salt, dimethylaminoethyl methacrylate methyl sulfate quaternary salt, dimethylaminoethyl acrylamide methyl sulfate quaternary salts, dimethylaminopropyl acrylamide methyl sulfate quaternary salts, dimethylaminopropyl methacrylamide methyl sulfate quaternary salts, diallyldimethyl ammonium chloride, N-vinyl formamide, dimethylamino ethyl methacrylate acid salts (including, but not limited to, sulfuric acid and hydrochloride acid salts), dimethylaminoethyl methacrylate methyl chloride quaternary salt, dimethylaminoethyl methacrylate benzyl chloride quaternary salt, methacrylamidopropyl trimethyl ammonium chloride, acrylamidopropyl trimethyl ammonium chloride, methylene bis acrylamide, triallylamine, acid salts of triallylamine, ethylene glycol dimethacrylate, hydroxymethylacrylate, hydroxyethylacrylate, hydroxypropylacrylate, hydroxypropylmethacrylate, diethylene glycol dimethacrylate, triethylene glycol dimethylacrylate, polyethylene glycol dimethacrylate, glycidyl methacrylate, acrylamidomethylpropane sulfonic acid and the sodium salt thereof, vinyl alcohol, vinyl acetate, and N-vinylpyrrolidone;

with the proviso that Q and W cannot both be the same;
wherein a is from about 0.001 to about 10.0 mole percent;
wherein j is from about 0 to about 99.999 mole percent;
wherein t is from about 0 to about 99.999 mole percent; and
wherein a+j+t=100;

$$G_a Q_v W_f S_c \tag{2}$$

wherein G is as previously defined;
wherein Q is as previously defined;
wherein W is as previously defined, with the proviso that Q and W cannot both be the same;
wherein S is selected from the group consisting of sulfomethylacrylamide and sulfoethylacrylamide;
wherein a is from about 0.001 to about 10.00 mole percent;
wherein v is from about 0 to about 97.999 mole percent;
wherein f is from about 1 to about 97.999 mole percent;
wherein c is from about 1 to about 40 mole percent; and
wherein a+v+f+c=100.

ii) using a fluorometer to detect the fluorescent signal of said tagged treatment polymer;

iii) converting the fluorescent signal of said tagged treatment polymer to the concentration of said tagged treatment polymer; and iv) adjusting the concentration of said tagged treatment polymer according to what the desired concentration is for said tagged treatment polymer in said industrial water system.

The fifth aspect of the instant claimed invention is a method for maintaining the desired amount of tagged treatment polymer in an industrial water system comprising the steps of:

a) adding an inert tracer and a tagged treatment polymer to the water of an industrial water system, wherein said tagged treatment polymer is selected from the group consisting of:

$$G_a Q_j W_t \tag{1}$$

wherein G is Monomer (Blue) as previously defined;
wherein Q is selected from the group consisting of acrylic acid and salts thereof, methacrylic acid and salts thereof, maleic acid and salts thereof, maleic anhydride, acrylamide, crotonic acid, acrylamidomethylpropane sulfonic acid and salts thereof;
wherein W is selected from the group consisting of:

acrylic acid and salts thereof, methacrylic acid and salts thereof, itaconic acid and salts thereof, maleic acid and salts thereof, maleic anhydride, crotonic acid and salts thereof, acrylamide, methacrylamide, vinyl sulfonic acid, styrene sulfonate, N-tertbutylacrylamide, N-isopropylacrylamide, butoxymethylacrylamide, N,N-dimethylacrylamide, N,N-diethylacrylamide, dimethylaminoethyl acrylate methyl chloride quaternary salts, dimethylaminoethyl acrylate benzyl chloride quaternary salts, dimethylaminoethyl acrylate methyl sulfate quaternary salt, dimethylaminoethyl methacrylate methyl sulfate quaternary salt, dimethylaminoethyl acrylamide methyl sulfate quaternary salts, dimethylaminopropyl acrylamide methyl sulfate quaternary salts, dimethylaminopropyl methacrylamide methyl sulfate quaternary salts, diallyldimethyl ammonium chloride, N-vinyl formamide, dimethylamino ethyl methacrylate acid salts (including, but not limited to, sulfuric acid and hydrochloride acid salts), dimethylaminoethyl methacrylate methyl chloride quaternary salt, dimethylaminoethyl methacrylate benzyl chloride quaternary salt, methacrylamidopropyl trimethyl ammonium chloride, acrylamidopropyl trimethyl ammonium chloride, methylene bis acrylamide, triallylamine, acid salts of triallylamine, ethylene glycol dimethacrylate, hydroxymethylacrylate, hydroxyethylacrylate, hydroxypropylacrylate, hydroxypropylmethacrylate, diethylene glycol dimethacrylate, triethylene glycol dimethacrylate, polyethylene glycol dimethacrylate, glycidyl methacrylate, acrylamidomethylpropane sulfonic acid and the sodium salt thereof, vinyl alcohol, vinyl acetate, and N-vinylpyrrolidone;

with the proviso that Q and W cannot both be the same;
wherein a is from about 0.001 to about 10.0 mole percent;
wherein j is from about 0 to about 99.999 mole percent;
wherein t is from about 0 to about 99.999 mole percent; and
wherein a+j+t=100;

$$G_a Q_v W_f S_c \quad (2)$$

wherein G is as previously defined;
wherein Q is as previously defined;
wherein W is as previously defined, with the proviso that Q and W cannot both be the same;
wherein S is selected from the group consisting of sulfomethylacrylamide and sulfoethylacrylamide;
wherein a is from about 0.001 to about 10.00 mole percent;
wherein v is from about 0 to about 97.999 mole percent;
wherein f is from about 1 to about 97.999 mole percent;
wherein c is from about 1 to about 40 mole percent; and
wherein a+v+f+c=100.

such that a desired concentration of said tagged treatment polymer is present in said water;

b) using a fluorometer to detect the fluorescent signals of said inert tracer and said tagged treatment polymer;

c) converting the fluorescent signals of said inert tracer and said tagged treatment polymer to the concentration of said inert tracer and said tagged treatment polymer; and d) adjusting the concentration of said tagged treatment polymer according to what the desired concentration is for said tagged treatment polymer in said industrial water system.

DETAILED DESCRIPTION OF THE INVENTION

Throughout this patent application the following definitions apply:

"anionic counter ion" refers to an organic or inorganic ion that bears a negative charge to counterbalance the positive charge present on the monomer. Examples include, but are not limited to chloride, sulfate, acetate, methylsulfate, hydroxide and bromide;

"aliphatic amine" refers to amines in which the amine group is attached to a saturated carbon atom;

"substituted aliphatic amine" refers to amines in which the amine group is attached to a saturated carbon of an organic molecule which may bear functional groups such as hydroxyl, carboxyl, etc.;

"1,2-diamino-substituted aromatic compound" refers to aromatic diamines in which the two amino groups are attached to two adjacent carbons of an aromatic compound;

"diamines" refers to an organic molecule which bears two amino groups anywhere in the molecule;

"Aldrich" refers to Aldrich Chemical Company, P.O. Box 2060, Milwaukee, Wis. 53201 USA, Telephone Numbers (414) 273-3850 and (800) 558-9160;

"alkyl", whenever it is used, refers to a fully saturated hydrocarbon moiety with from 1 to 10 carbon atoms;

"dialkylamino" refers to a moiety of the formula $R_{21}$—N—$R_{22}$, where $R_{21}$ and $R_{22}$ are alkyl;

"alkoxy" refers to a moiety of the formula RO—, where R is alkyl;

"alkylamidoalkyl" refers to a moiety of the formula R—(O)NH—$R_1$—, where R and $R_1$ are alkyl;

"alkylamino" refers to a moiety of the formula R—NH—, where R is alkyl;

"alkoxylalkyl" refers to a moiety of the formula R—O—$R_1$, where R and $R_1$ are alkyl;

"aryl" refers to a moiety of the formula Ar—, where Ar is an aromatic unit; "carboxylate" refers to a moiety of —C(O)OM, where M is H, Na or another cationic counter ion;

"halogen" refers to a moiety selected from the group consisting of F, Cl, Br, and I;

"hydroxyalkyl" refers to a moiety where an —OH group is attached to an alkyl group;

"Nalco" refers to Ondeo Nalco Company, Ondeo Nalco Center, Naperville, Ill. (630) 305-1000;

"vinyl" refers to a moiety which has a carbon-carbon double bond;

"vinylbenzyl" refers to a moiety of the formula;

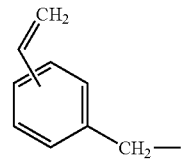

and "vinylbenzyloxy" refers to a moiety of the formula:

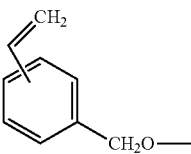

"Chain Transfer Agent" refers to any molecule, used in free-radical polymerization, which will react with a polymer radical forming a dead polymer and a new radical. Representative Chain Transfer Agents are listed by K. C. Berger and G. Brandrup, "*Transfer Constants to Monomer, Polymer, Catalyst, Solvent, and Additive in Free Radical Polymerization,*" Section II, pp. 81-151, in "*Polymer Handbook*," edited by J. Brandrup and E. H. Immergut, 3d edition, 1989, John Wiley & Sons, New York.

"Cross-Linking Agent" refers to an ethylenically unsaturated monomer either containing at least two sites of ethylenic unsaturation or containing one site of ethylenic unsaturation and one site of a reactive group such as an epoxide or an aldehyde. A Cross-Linking Agent is added to branch or increase the molecular weight of the tagged treatment polymer of this invention. Representative Cross-Linking Agents include N,N-methylenebisacrylamide, N,N-methylenebismethacrylamide, polyethylene glycol diacrylate, ethylene glycol dimethacrylate, diethylene glycol dimethacrylate, triethylene glycol dimethacrylate, polyethylene glycol dimethacrylate, polypropylene glycol dimethacrylate, N-vinyl acrylamide, divinyl benzene, triallyl ammonium salts, N-methyl allylacrylamide, glycidyl acrylate, acrolein, methylolacrylamide, glyoxal, epichlorohydrin, and the like. The crosslinker is added at from about 0.0001 to about 10, preferably from about 0.0001 to about 0.2 weight percent based on the weight of the polymer;

"Branching Agent" refers to a "Cross-Linking Agent" that is administered at a low level (less than 0.05 weight percent based on the weight of the polymer). It is understood that Branching Agents are added to form "branches" not cross-links; and "HLB" refers to a hydrophilic-lipophilic balance number.

The present invention is based upon the discovery of a group of fluorescent monomers which are useful in the preparation of tagged treatment polymers containing same, with said tagged treatment polymers in turn being able to provide a means for achieving better monitoring in industrial water systems.

The first aspect of the instant claimed invention is a fluorescent monomer selected from the group consisting of compounds of the formulae:

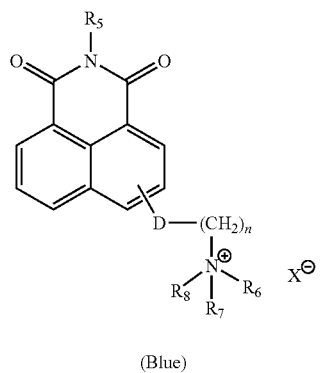

(Blue)

wherein n is an integer, selected from the group consisting of 1-10;

$R_6$ and $R_7$ are alkyl;

$R_8$ is selected from the group consisting of allyl, alkyl, vinylbenzyl and 2-hydroxy-3-allyloxy-propyl;

$R_5$ is selected from the group consisting of alkyl, alkylamino, hydroxyalkyl and allyl;

D is oxygen or nitrogen or sulfur or nonexistent; with the proviso that when D is nonexistent, $(CH_2)_n$ is bonded directly to a carbon on the ring; and X is an anionic counter ion.

Preferred monomers are selected from the group consisting of

Monomer (Blue),
wherein
$R_5$ is alkyl and allyl;
$R_6$ is alkyl;
$R_7$ is alkyl;
$R_8$ is allyl, alkyl, vinylbenzyl and 2-hydroxy-3-allyloxypropyl;
D is oxygen;
X is an anionic counter ion.

The most preferred monomers are selected from the group consisting of Monomer (Blue) where
$R_5$ is allyl;
$R_6$ is methyl;
$R_7$ is methyl;
$R_8$ is methyl;
D is oxygen;
X is methyl sulfate.

An acceptable name for the most preferred monomer is:
N-allyl-4-(2-N',N'-dimethylaminoethoxy) naphthalimide, methyl sulfate quaternary salt.

Monomers of formula Monomer (Blue) can be synthesized using a three step procedure with materials that are commercially available from sources such as Aldrich.

In the first step of a synthesis of Monomer (Blue), a substituted naphthalic anhydride is reacted with a primary amine. The amine can be aliphatic, vinyl or substituted aliphatic such as 3-dimethylaminopropylamine. Suitable solvents for this reaction include water, glacial acetic acid or any solvent system known in the art of organic chemistry that is suitable for forming the aromatic ring which serves as the "fluorescent core" of the monomer.

In the second step of the synthesis of Monomer (Blue), the substituted naphthalimide created in the first step is further reacted with a suitable dialkylaminoalkyl alcohol, thiol or amine. For example, 4-chloro-N-allyl-naphthalimide can be reacted with N,N-dimethylaminoethanol to yield N-allyl-4-(N',N'-dimethylaminoethoxy)naphthalimide.

In the third step of the synthesis of Monomer (Blue), the tertiary amine group is reacted with an allyl, alkyl or vinyl benzyl halide or allyl glycidyl ether. This acts to create a monomer with water solubility and also can add a polymerizable vinyl group to the molecule.

"Tagging" the polymer through the use of the fluorescent monomers of this invention is achieved by synthesizing the polymer in the presence of the fluorescent monomer.

Accordingly, once a monomer selected from the group consisting of Monomer (Blue) monomers is synthesized, the selected monomer can be used to synthesize tagged treatment polymers of formula:

$$G_a Q_j W_t \quad (1)$$

wherein G is Monomer (Blue) as previously defined;

wherein Q is selected from the group consisting of acrylic acid and salts thereof, methacrylic acid and salts thereof, maleic acid and salts thereof, maleic anhydride, acrylamide, crotonic acid acrylamidomethylpropane sulfonic acid and salts thereof;

wherein W is selected from the group consisting of:

acrylic acid and salts thereof, methacrylic acid and salts thereof, itaconic acid and salts thereof, maleic acid and salts thereof, maleic anhydride, crotonic acid and salts thereof, acrylamide, methacrylamide, vinyl sulfonic acid, styrene sulfonate, N-tertbutylacrylamide, N-isopropylacrylamide, butoxymethylacrylamide, N,N-dimethylacrylamide, N,N-diethylacrylamide, dimethylaminoethyl acrylate methyl chloride quaternary salts, dimethylaminoethyl acrylate benzyl chloride quaternary salts, dimethylaminoethyl acrylate methyl sulfate quaternary salt, dimethylaminoethyl methacrylate methyl sulfate quaternary salt, dimethylaminoethyl acrylamide methyl sulfate quaternary salts, dimethylaminopropyl acrylamide methyl sulfate quaternary salts, dimethylaminopropyl methacrylamide methyl sulfate quaternary salts, diallyldimethyl ammonium chloride, N-vinyl formamide, dimethylamino ethyl methacrylate acid salts (including, but not limited to, sulfuric acid and hydrochloride acid salts), dimethylaminoethyl methacrylate methyl chloride quaternary salt, dimethylaminoethyl methacrylate benzyl chloride quaternary salt, methacrylamidopropyl trimethyl ammonium chloride, acrylamidopropyl trimethyl ammonium chloride, methylene bis acrylamide, triallylamine, acid salts of triallylamine, ethylene glycol dimethacrylate, hydroxymethylacrylate, hydroxyethylacrylate, hydroxypropylacrylate, hydroxypropylmethacrylate, diethylene glycol dimethacrylate, triethylene glycol dimethylacrylate, polyethylene glycol dimethacrylate, glycidyl methacrylate, acrylamidomethylpropane sulfonic acid and the sodium salt thereof, vinyl alcohol, vinyl acetate, and N-vinylpyrrolidone;

with the proviso that Q and W cannot both be the same;
wherein a is from about 0.001 to about 10.0 mole percent;
wherein j is from about 0 to about 99.999 mole percent;
wherein t is from about 0 to about 99.999 mole percent; and
wherein a+j+t=100;

$$G_a Q_v W_f S_c \qquad (2)$$

wherein G is as previously defined;
wherein Q is as previously defined;
wherein W is as previously defined, with the proviso that Q and W cannot both be the same;
wherein S is selected from the group consisting of sulfomethylacrylamide and sulfoethylacrylamide;
wherein a is from about 0.001 to about 10.00 mole percent;
wherein v is from about 0 to about 97.999 mole percent;
wherein f is from about 1 to about 97.999 mole percent;
wherein c is from about 1 to about 40 mole percent; and
wherein a+v+f+c=100.

These tagged treatment polymers can be synthesized by following the procedure for conventional free radical polymerization in an aqueous medium. They can be made by water-in-oil polymerization methods or dispersion polymerization methods or solution polymerization methods. For those tagged treatment polymers containing a sulfomethylated or sulfoethylated acrylamide, the polymers are first created with an acrylamide moiety, and then the acrylamide groups are sulfomethylated using a suitable "sulfo" reagent such as formaldehyde and sodium metabisulfite.

Procedure for Synthesizing Water-in-Oil Emulsion Polymers

The preparation of high molecular weight water-in-oil emulsion polymers has been described in the following references: U.S. Pat. No. 2,982,749 assigned to The Dow Chemical Company; U.S. Pat. No. 3,284,393 assigned to The Dow Chemical Company; U.S. Pat. No. 3,734,873 assigned to Nalco Chemical Company; "Mechanism, Kinetics and Modeling of the Inverse-Microsuspension Homopolymerization of Acrylamide," by Hundeler, D., Hamielec, A. and Baade, W., *Polymer* (1989), 30(1), 127-42; and "Mechanism, Kinetics and Modeling of Inverse-Microsuspension Polymerization: 2. Copolymerization of Acrylamide with Quaternary Ammonium Cationic Monomers," by D. Hunkeler and A. E. Hamielec; *Polymer* (1991), 32(14), 2626-40.

A general procedure for the manufacture of water-in-oil emulsion tagged treatment polymers is provided to illustrate the preparation of these tagged treatment polymers using fluorescent monomers. The types and quantities of specific components in the formula (monomers, initiators, Chain Transfer Agents, for example) will vary depending upon the type of polymer (cationic, anionic, nonionic) that is being synthesized.

An aqueous phase is prepared by mixing together in water one or more water soluble monomers, and different polymerization additives such as inorganic salts, chelants, pH buffers, Chain Transfer Agents and Branching or Cross-Linking Agents. In order to synthesize the tagged treatment polymers of the instant claimed invention, a monomer selected from the group of possible Monomer (Blue) monomers is included in the aqueous phase at the desired level.

An organic phase is prepared by mixing together an inert hydrocarbon liquid with one or more oil soluble surfactants. The surfactant mixture should have a low HLB, to ensure the formation of an oil continuous emulsion. Appropriate surfactants for water-in-oil emulsion polymerizations, which are commercially available, are compiled in the North American Edition of McCutcheon's *Emulsifiers & Detergents*. The oil phase may need to be heated to ensure the formation of a homogeneous oil solution.

The oil phase is charged into a reactor equipped with a mixer, a thermocouple, a nitrogen purge tube, and a condenser. Adding the aqueous phase to the reactor containing the oil phase with vigorous stirring forms an emulsion. The resulting emulsion is heated to the desired temperature, purged with nitrogen, and a free-radical initiator is added. The reaction mixture is stirred for several hours under a nitrogen atmosphere at the desired temperature. Upon completion of the reaction, the water-in-oil emulsion polymer is cooled to room temperature, where any desired post-polymerization additives, such as antioxidants, or a high HLB surfactant (as described in U.S. Pat. No. 3,734,873) may be added.

The resulting emulsion polymer is a free-flowing liquid. An aqueous solution of the water-in-oil emulsion polymer can be generated by adding a desired amount of the emulsion polymer to water with vigorous mixing in the presence of a high-HLB surfactant (as described in U.S. Pat. No. 3,734,873).

Procedure for Synthesizing Dispersion Polymers

The preparation of dispersion polymers has been described in the following references: U.S. Pat. No. 4,929,655, assigned to Hymo Corporation; U.S. Pat. No. 5,006,590, assigned to Hymo Corporation; U.S. Pat. No. 5,597,859, assigned to Nalco Chemical Company; European Patent 657,478; U.S. Pat. No. 5,597,858, assigned to Nalco Chemical Company and European Patent 630,909.

A general procedure for the manufacture of dispersion tagged treatment polymers is provided in the following text in order to illustrate the preparation of dispersion tagged treatment polymers comprising the fluorescent monomers described herein. The types and quantities of specific components in the formula (salts and stabilizer polymers, for example) will vary depending upon the type of polymer (cationic, anionic, nonionic) that is being synthesized.

An aqueous solution containing one or more inorganic salts, one or more water-soluble monomers, any polymerization additives such as chelants, pH buffers, Chain Transfer Agents, Branching or Cross-Linking Agents and a water-soluble stabilizer polymer is charged to a reactor equipped with a mixer, a thermocouple, a nitrogen purging tube, and a water condenser. The monomer solution is mixed vigorously, heated to the desired temperature, and then a water-soluble initiator is added. The solution is purged with nitrogen while maintaining temperature and mixing for several hours. After this time, the products are cooled to room temperature, and any post-polymerization additives are charged to the reactor. Water continuous dispersions of water-soluble polymers are free flowing liquids with product viscosities generally 100-10,000 cP, measured at low shear. Thus, in order to prepare tagged polymers as dispersions, a monomer selected from the group of all possible Monomer (Blue) monomers is included in the reaction mixture at the desired level.

Procedure for Synthesizing Solution Polymers

A general procedure for the manufacture of solution polymers is provided to illustrate the preparation of the solution tagged treatment polymers comprising the fluorescent monomers described herein. One typical process is described as follows: One or more monomers are added to a vessel followed by neutralization with a suitable base. The fluorescent monomer can then be added to this monomer solution after neutralization or alternatively, to the reaction vessel. A determined amount of water is then added to the reaction vessel, which is then heated and purged. Polymerization catalysts may also be added to the vessel initially or fed in gradually during the course of the reaction. Water soluble polymerization initiators such as any azo or redox initiator or combination thereof are added along with the monomer solution to the reaction mixture in separate feeds over the same amount of time, usually 2 to 6 hours. The reaction temperature is maintained at about 60-70° C. Additional initiator may be used after addition is complete to reduce residual monomer levels.

The amount of fluorescent monomer that is used should be an amount sufficient to allow the tagged treatment polymer to be detected in the aqueous environment that it is used. The minimum amount of fluorescent moiety that can be used is that amount which gives a signal-to-noise ratio (S/N) of 3 at the desired tagged treatment polymer dosage. The signal-to-noise ratio is that value where the magnitude of the transduced signal (including but not limited to electronic and optical signals) due to the presence of a target analytic in a measurement device is greater than or equal to a level three (3) times the magnitude of a transduced signal where the analyte (species) of interest is not present in the measurement device.

The amount of fluorescent monomer in the tagged treatment polymers is in the range of from about 0.001 mole percent to about 10 mole percent, preferably from about 0.01 mole percent to about 0.4 mole percent, and most preferably from about 0.05 mole percent to about 0.35 mole percent. For purposes of this patent application, mole percent of all monomers in the tagged treatment polymer is calculated based on weight percent. For purposes of this patent application, the subscripts a, j, t, v, f and c refer to the mole percent of each monomer component of the tagged treatment polymers.

The remainder of the tagged treatment polymer can have one, two or three additional monomers in it.

All molecular weights in this patent application are weight average molecular weights measured by gel permeation chromatography (GPC) calculated from both refractive index and fluorescent detector traces using polystyrene sulfonate (PSS) molecular weight standards. Tagged treatment polymers that have a wide range of molecular weights can be prepared by using the procedures described previously by those skilled in the art.

The molecular weights of the instant claimed tagged treatment polymers are from about 500 atomic mass units (hereinafter "a.m.u.") to about 10,000,000 a.m.u. Preferably the molecular weights are from about 2000 a.m.u. to about 500,000 a.m.u. Most preferably, the molecular weights are from about 5000 a.m.u. to about 40,000 a.m.u.

Preferred tagged polymers are made via solution polymerization techniques and have a molecular weight from about 5,000 a.m.u. to about 40,000 a.m.u.

Preferred tagged treatment polymers are where said fluorescent monomer is:

N-allyl-4-(2-N',N'-dimethylaminoethoxy) naphthalimide, methyl sulfate quaternary salt(4-NADMAEN-MSQ).

The more preferred polymers are where G is N-allyl-4-(2-N',N'-dimethylaminoethoxy) naphthalimide, methyl sulfate quaternary salt(4-NADMAEN-MSQ); Q, if present in the polymer, is selected from the group consisting of acrylamide and acrylic acid;

W, if present in the polymer, is selected from the group consisting of acrylamide and acrylamidomethylpropane sulfonic acid; and S, if present in the polymer, is N-sulfomethylacrylamide.

The most preferred polymers are selected from the group consisting of 0.04 mole % 4-NADMAEN-MSQ, 49.98 mole % acrylic acid and 49.98 mole % acrylamide;

Once created the tagged treatment polymers of the instant claimed invention can be used as scale inhibitors in industrial water systems. As these polymers are consumed performing that function, their fluorescent signal will decrease and thus the decrease in the fluorescent signal can be used to indicate that undesired scaling is taking place.

The tagged treatment polymers containing a fluorescent monomer can be used in industrial water systems. Examples of industrial water systems are cooling tower water systems (including open recirculating, closed and once-through systems); petroleum wells, downhole formations, geothermal wells and other oil field applications; boilers and boiler water systems; mineral process waters including mineral washing, flotation and benefaction; paper mill digesters, paper production, washers, bleach plants and white water systems; black liquor evaporators in the pulp industry; gas scrubbers and air washers; continuous casting processes in the metallurgical industry; air conditioning and refrigeration systems; industrial and petroleum process water; indirect contact cooling and heating water, such as pasteurization water; water reclamation and purification systems; membrane filtration water systems; food processing streams (meat, vegetable, sugar beets, sugar cane, grain, poultry, fruit and soybean); and waste treatment systems as well as in clarifiers, liquid-solid applications, municipal sewage treatment and industrial or municipal water systems.

The tagged treatment polymer comprising a fluorescent monomer may be used in the industrial water systems singly or in combination with other polymers, which are not tagged. The dosage rate of tagged treatment polymer in an industrial water system, when it is being used as a scale inhibitor, is from about 1 to about 100 milligrams of solid component active per liter of water.

The third aspect of the instant claimed invention is a process for the inhibition of scale formation in an industrial water system which comprises introducing into said industrial water system a tagged treatment polymer, previously described, in an amount sufficient to inhibit scale formation. The amount of the tagged treatment polymer comprising the fluorescent monomer added to an industrial water system is in the range of about 1.0 milligrams (mg) to about 30 milligrams of the total solid polymer actives per liter of water in the system. This is equivalent to about 1 part per million (ppm) to about 30 ppm.

When used in an industrial water system, the fluorescent signal of the tagged treatment polymers can be used to determine how much tagged treatment polymer is present in the industrial water system. Therefore, the fourth aspect of the instant claimed invention is:

A method for maintaining the desired amount of tagged treatment polymer in an industrial water system comprising the steps of:

i) adding to said industrial water system a tagged treatment polymer, wherein said tagged treatment polymer is as previously described;

ii) using a fluorometer to detect the fluorescent signal of said tagged treatment polymer;

iii) converting the fluorescent signal of said tagged treatment polymer to the concentration of said tagged treatment polymer; and iv) adjusting the concentration of said tagged treatment polymer according to what the desired concentration is for said tagged treatment polymer in said industrial water system.

The fifth aspect of the instant claimed invention is as follows.

A method for maintaining the desired amount of tagged treatment polymer in an industrial water system comprising the steps of:
  a) adding an inert tracer and a tagged treatment polymer, as previously described, to water such that a desired concentration of said tagged treatment polymer is present in said water;
  b) using a fluorometer to detect the fluorescent signals of said inert tracer and said tagged treatment polymer;
  c) converting the fluorescent signals of said inert tracer and said tagged treatment polymer to the concentration of said inert tracer and said tagged treatment polymer; and
  d) adjusting the concentration of said tagged treatment polymer according to what the desired concentration is for said tagged treatment polymer in the industrial water system.

An advantage of the fluorescent monomers of this invention is that in their use in the formation of a tagged treatment polymer, the fluorescent monomer is not significantly affected by other structures in the polymer or by other ingredients in the system. Thus, the polymers are stable in the presence of STA•BR•EX®, where STA•BR•EX® is the trademark for an oxidizing biocide, available from Nalco Chemical Company, One Nalco Center, Naperville, Ill. 60563.

A further advantage of the tagged treatment polymers of this invention is that the spectral properties, i.e. both excitation and emission of the polymers are in the near visible wavelength region (>370 nm), thus allowing the use of solid state instrumentation and potentially minimize interferences that generally occur in the UV wavelength region.

The following examples are presented to be illustrative of the present invention and to teach one of ordinary skill how to make and use the invention. These examples are not intended to limit the invention or its protection in any way.

EXAMPLES

Monomer Example 1

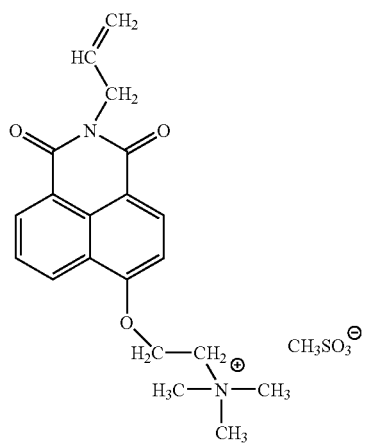

Preparation of N-allyl-4-(2-N',N'-dimethylaminoethoxy)naphthalimide, methyl sulfate quaternary salt (4-NADMAEN-MSQ)

Step One: Synthesis of 4-chloro-N-allyl-naphthalimide(I)

A 100 ml round bottom flask was charged with 4-chloro-1,8-naphthalic anhydride (5.98 g, 25.7 mmol), allyl amine (1.522 g, 26.7 mmol), and glacial acetic acid (50 ml). The contents were refluxed for 5 hours. Upon cooling, water was added followed by neutralization with 50% sodium hydroxide solution. The tan precipitate was collected by filtration, washed, and dried.

Step Two: Synthesis of N-allyl-4-(N',N'-dimethylaminoethoxy)naphthalimide (II)

A 300 ml Parr reactor was charged with 4-chloro-N-allyl-naphthalimide(I) (2 g, 7.38 mmol), N,N-dimethylaminoethanol (20 g, 0.224 mole), and potassium hydroxide (2 g, 35.7 mmol). The reactor was purged with $N_2$ for 10 minutes, sealed and then heated to 150° C. for 4 hours. Upon cooling, the volatiles were stripped and a crude orange/yellow solid was obtained.

Step Three: Synthesis of N-allyl-4-(2-N',N'-dimethylaminoethoxy)naphthalimide, methyl sulfate quaternary salt A 50 ml round bottom flask was charged with N-allyl-4-(2-N',N'-dimethylaminoethoxy)naphthalimide(II)(1.5 g, 4.63 mmol), acetone (30 ml), and dimethyl sulfate (1.3 g, 10.31 mmol), and heated to reflux for 15 hours. The tan solid which formed was collected and washed with acetone.

Polymer Example 1

Preparation of 0.04 Mole % 4-NADMAEN-MSQ/49.98 mole % Acrylic Acid/49.98 mole % Acrylamide A suitable reactor was charged with deionized water (133.7 g), and 4-NADMAEN-MSQ (prepared according to Monomer Example 1, 0.458 g, 1.02 mmol) and heated to 65° C. with stirring (750 rpm). At this temperature, initiator solution 1 (3.50 g ammonium persulfate in 19.59 g of deionized water), and initiator solution 2 (10.48 g sodium metabisulfite in 30.30 g of deionized water) were added separately at a constant flow rate over a period of 3.25 hours. Five minutes after initiator feed had started, a monomer solution consisting of deionized water (13.57 g), acrylic acid (92.48 g, 1.28 mole), 48.7% acrylamide (186.61 g, 1.28 mole), and 50% sodium hydroxide (42.3 g, 0.529 mole) was added separately at a constant flow rate over a period of 3 hours. After monomer and initiator feeding was complete, the reaction was held at temperature for an additional 30 minutes. The product had a molecular weight of approximately 11,800 and 37% incorporation of the tag, as measured by gel permeation chromatography (GPC) calculated from both refractive index and fluorescent detector traces using polystyrene sulfonate (PSS) MW standards.

Method of Use Example 1

Stability and Performance Testing

The fluorescence properties (excitation and emission maxima) of a polymer made in Polymer Example 1 are given in Table I. Excitation maxima are all greater than 370 nm. The fluorescence of the polymer remained invariant over a pH range of approximately 2-12.

Another important feature of these polymers is the stability of the fluorescence in the presence of oxidizing biocides. The oxidizing biocide stability test was performed in the following manner. Solutions of simulated water were prepared with the desired levels of cations and anions at the desired pH. For these experiments the simulated cooling water contained 360 ppm Ca (as $CaCO_3$), 200 ppm Mg (as $CaCO_3$), 300 ppm alkalinity (as $CaCO_3$) and 15 ppm of a stable phosphonate, to stabilize the water and prevent $CaCO_3$ precipitation. The water was then adjusted to the desired pH with HCl or NaOH. Tests were performed at pH 7 and 9. A series of three amber bottles were labeled with the desired test sample. A 25 ml aliquot of the simulated water was delivered into each of the three labeled bottles. To one of the bottles (labeled "B") was delivered 30 µl of a 1200 ppm stock solution of bleach. To a second bottle (labeled "S") was delivered 30 µl of a 1200 ppm stock solution of STABREX® biocide, available from Nalco. To the third bottle (labeled "N") was delivered 30 µl distilled water. The amount of free and total chorine was measured immediately after the samples were prepared and 24 hrs later at the time of fluorescence analysis. The bottles were stored for 24 hrs in the dark. After 24 hours, fluorescence measurements were done using the sample marked "N" as the reference sample. The % fluorescence consumed (hereinafter "% Fl consumed") in the presence of an oxidizing biocide was calculated as shown below. It is important to note that lower levels of % Fl Consumed indicate lower loss of fluorescent emission. Results for the polymer created in Polymer Example I are given in Table I.

$$\% \text{ Fl Consumed} = \frac{\text{Intensity of N Sample} - \text{Intensity of B or S Sample}}{\text{Intensity of N Sample}} \times 100$$

TABLE I

Summary of Fluorescence Properties and Oxidizing Biocide Stability of Polymer Prepared As Previously Described

| Polymer Example | Monomer Name | Fluorescence Properties | Oxidizing Biocide Stability (% Fluorescence Consumed) |
|---|---|---|---|
| 1 | 4-NADMAEN-MSQ | Ex = 370 nm Em = 450 nm | STABREX (pH9) = 4% |

When using the tagged treatment polymer as a compound of a scale inhibitor product in an industrial water system, the only decrease or loss of fluorescence signal from the polymer should be due to loss of the polymer under scaling conditions. When identifying a scaling event as the reason for a loss of fluorescence, it is undesirable for the level of fluorescence to also vary based on pH changes, other components present in the cooling water system, or from oxidizing biocides such as the STABREX® biocide system.

If the amount consumed by an oxidizing biocide is less than 10% of the signal, then the tagged treatment polymer can be used in an industrial water system. The particular polymer tested is suitable for use in systems containing STABREX.

The specific examples herein disclosed are to be considered as being primarily illustrative. Various changes beyond those described will, no doubt, occur to those skilled in the art; such changes are to be understood as forming a part of this invention insofar as they fall within the spirit and scope of the appended claims.

We claim:

1. The monomer N-allyl-4-(2-N',N'-dimethylaminoethoxy)naphthalimide, methyl sulfate quaternary salt.

* * * * *